US011647318B1

(12) United States Patent
Lim et al.

(10) Patent No.: US 11,647,318 B1
(45) Date of Patent: May 9, 2023

(54) AUDIO ACCESSORY SYSTEM AND HOLDER TO HOLD AN AUDIO ACCESSORY IN TWO POSITIONS

(71) Applicant: MOTOROLA SOLUTIONS, INC., Chicago, IL (US)

(72) Inventors: Sze Yen Lim, Penang (MY); Chi Meng Khong, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/551,364

(22) Filed: Dec. 15, 2021

(51) Int. Cl.
    *H04R 1/02*     (2006.01)
    *H04R 1/08*     (2006.01)
    *H01R 24/68*     (2011.01)
    *H04B 1/3827*     (2015.01)

(52) U.S. Cl.
CPC ............ *H04R 1/083* (2013.01); *H01R 24/68* (2013.01); *H04B 1/385* (2013.01); *G06F 2213/0042* (2013.01); *H04B 2001/3872* (2013.01)

(58) Field of Classification Search
CPC ............ H04R 1/02; H04R 1/105; H04R 1/08
USPC ........................................ 381/361, 365, 366
See application file for complete search history.

(56) References Cited

U.S. PATENT DOCUMENTS

| | | | |
|---|---|---|---|
| 5,898,789 A * | 4/1999 | Nichols ................ | H01R 13/506 381/361 |
| 6,424,723 B1 * | 7/2002 | Jing ......................... | H04R 1/08 381/361 |
| 6,661,899 B1 * | 12/2003 | Phinisee-Washington ................... | H04R 5/023 434/318 |
| 7,302,072 B2 * | 11/2007 | Skillicorn ................ | H04R 1/08 381/364 |
| 8,306,582 B2 | 11/2012 | Williams et al. | |
| 9,955,761 B2 | 5/2018 | Maddox et al. | |
| 2012/0275633 A1 * | 11/2012 | Schreiber .................. | H04R 1/08 381/361 |
| 2015/0098602 A1 * | 4/2015 | Levinsohn ............. | H04R 1/083 381/361 |

* cited by examiner

*Primary Examiner* — Suhan Ni
(74) *Attorney, Agent, or Firm* — Perry + Currier, Inc.

(57) ABSTRACT

An audio accessory system that includes a holder to hold an audio accessory in two positions is provided. The holder comprises a first retention platform having a cable coupled thereto, a second retention platform and a back retention wall extending between the first and second retention platforms. The first and second retention platforms and the back retention wall form a clip for retaining the audio accessory. The holder further comprises an electrical interface, at the back retention wall, for coupling the cable to a corresponding electrical interface of the audio accessory. The clip is interchangeably mountable in first and second positions relative to the audio accessory, such that: in the first and second positions, respectively, the clip mounts to the audio accessory with the cable extending from a bottom or a top of the audio accessory.

18 Claims, 10 Drawing Sheets

US 11,647,318 B1

AUDIO ACCESSORY SYSTEM AND HOLDER TO HOLD AN AUDIO ACCESSORY IN TWO POSITIONS

BACKGROUND OF THE INVENTION

Some audio accessories that include speakers, such as remote speaker microphones (RSMs), and the like, may be body worn. However, depending on how an audio accessory is attached to a body (e.g. fastened to clothing), accessibility to buttons at the audio accessory may be reduced, and/or speakers of the audio accessory may be blocked when buttons are accessed.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
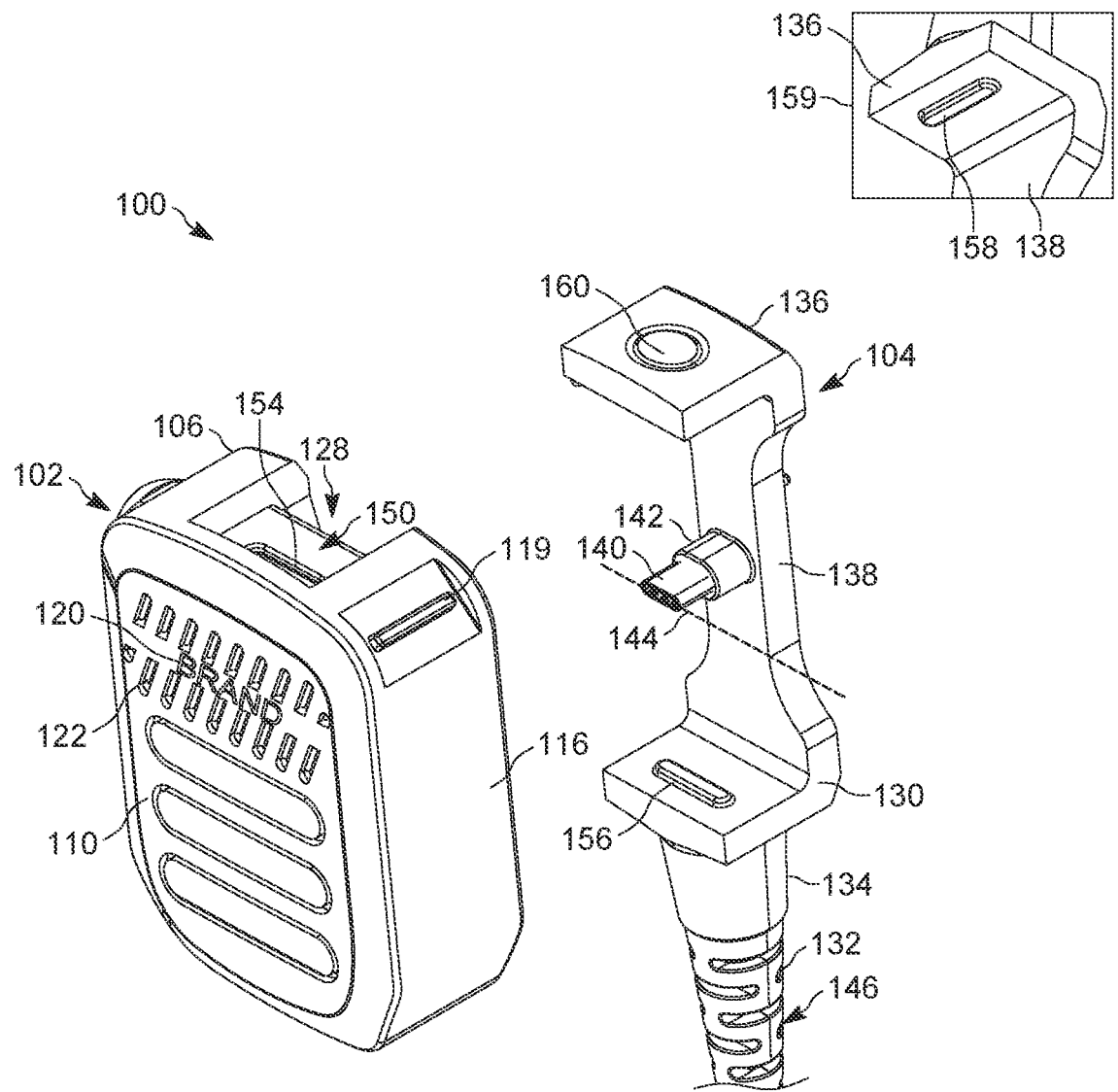
FIG. 1 is a front perspective view of an audio accessory system that includes a holder to retain an audio accessory in two positions, showing a top of the audio accessory, and with the holder being mounted to the audio accessory in a first position, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Some audio accessories that include speakers, such as remote speaker microphones (RSMs), and the like, may be body worn. However, depending on how an audio accessory is attached to a body (e.g. fastened to clothing), accessibility to buttons at the audio accessory may be reduced, and/or speakers of the audio accessory may be blocked when buttons are accessed. For example, first responders, such as police officers, and the like, often attach an RSM to their shoulder with a cable to a radio going down a front of their uniform (e.g. the radio worn on a belt around their waist, and the like). However, other first responders may attach the RSM to their shoulder with the cable draped over their back (e.g. the radio won on a belt around their waist, and the like), which results in the RSM being upside down. As such, a button of the RSM may not be easily accessible in both of these positions, and/or position of the button of the RSM may change relative to the user in these positions. Similarly, accessing the button may result in the first responder blocking a speaker and/or microphone of the RSM with their hand as they reach across the RSM to access the button in one (or both) of these positions. Thus, there exists a need for an improved audio accessory system that includes a holder to hold an audio accessory in two positions.

Hence, provided herein is an audio accessory system that includes an audio accessory, such as an RSM, and a holder. The audio accessory generally has a top and bottom such that the audio accessory has an upright orientation that has, for example, a button in a given orientation (e.g. at a left or right side) in the upright orientation. In some examples, the audio accessory further includes product branding (e.g. at a front side, the product branding comprising alphanumeric and/or graphics) that is readable in the upright orientation. The audio accessory further includes an electrical interface, for example at a back side.

The holder generally includes first and second retention platforms. A cable extends from one of first and second retention platforms. The cable may connect to a radio. The holder further comprise a back retention wall extending between the first and second retention platforms. The first and second retention platforms and the back retention wall form a clip for retaining the audio accessory in two positions. In general, in the first position, the clip mounts to the audio accessory with the cable extending from a top of the audio accessory, and, in the second position, the clip mounts to the audio accessory with the cable extending from a bottom of the audio accessory. The holder further comprises an electrical interface, located at the back retention wall, the electrical interface for coupling the cable to the corresponding electrical interface of the audio accessory in both of the two positions, such that the audio accessory connects to the cable via the electrical interfaces, which further communicatively couples the audio accessory to the radio. Hence, the clip of the holder may mount to the back side of the audio accessory. As such, a user, such as a first responder, may mount the audio accessory in the holder in one of the two positions, depending on whether the first responder prefers to have the cable going down a front of their clothing and/or uniform or over their shoulder and draped over their back. Regardless, of the position, the audio accessory may be in a same upright orientation, and hence a button of the audio accessory may be in a same position, relative to the user, in both the positions.

An aspect of the present specification provides an audio accessory system comprising: an audio accessory; and a holder for the audio accessory comprising: a first retention platform having a cable coupled thereto; a second retention platform; a back retention wall extending between the first retention platform and the second retention platform, the first retention platform, the second retention platform and the back retention wall generally forming a clip for retaining the audio accessory; and an electrical interface, located at the back retention wall, the electrical interface for coupling the cable to a corresponding electrical interface of the audio accessory, and the clip being interchangeably mountable in a first position and a second position relative to the audio accessory, such that: in the first position, the clip mounts to the audio accessory with the cable extending from a bottom of the audio accessory, and in the second position, the clip mounts to the audio accessory with the cable extending from a top of the audio accessory.

An aspect of the present specification provides a holder for an audio accessory, the holder comprising: a first retention platform having a cable coupled thereto; a second retention platform; a back retention wall extending between the first retention platform and the second retention platform, the first retention platform, the second retention platform and the back retention wall generally forming a clip for retaining the audio accessory; and an electrical interface, located at the back retention wall, the electrical interface for coupling the cable to a corresponding electrical interface of the audio accessory, and the clip being interchangeably mountable in a first position and a second position relative to the audio accessory, such that: in the first position, the clip mounts to the audio accessory with the cable extending from a bottom of the audio accessory, and in the second position, the clip mounts to the audio accessory with the cable extending from a top of the audio accessory.

Each of the above-mentioned embodiments will be discussed in more detail below, starting with example system and device architectures of the system in which the embodiments may be practiced.

Further advantages and features consistent with this disclosure will be set forth in the following detailed description, with reference to the figures.

Figure 2:
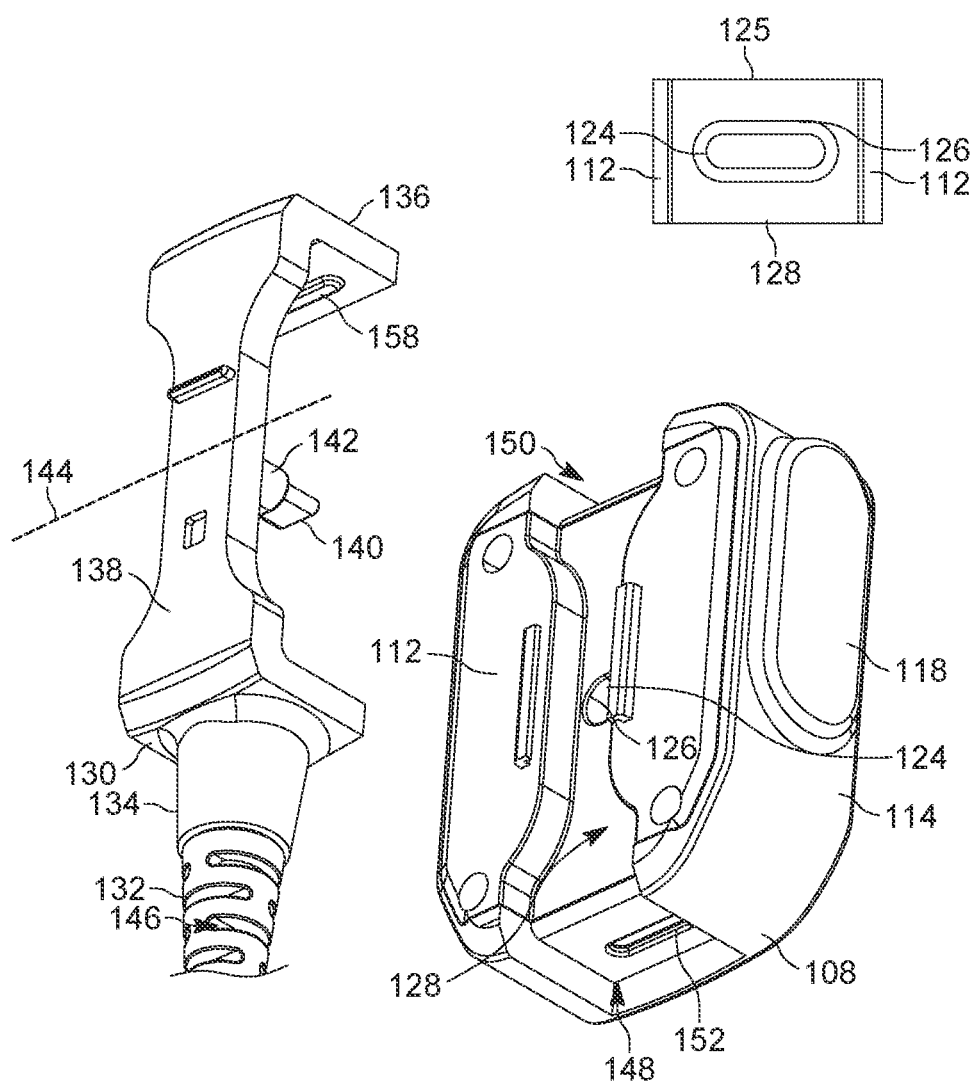
FIG. 2 is a back perspective view of the audio accessory system of FIG. 1, that shows a bottom of the audio accessory, in accordance with some examples.

Attention is directed to FIG. 1 and FIG. 2, which respectively depict front and back perspective views of an audio accessory system 100 (interchangeably referred to hereafter as the system 100). The system 100 includes an audio accessory 102 and a holder 104 to hold and/or retain the audio accessory 102 in two positions.

The audio accessory 102 has a top 106, a bottom 108, a front 110, a back 112, a left side 114 and a right side 116. The audio accessory 102 further includes a button 118 on the left side 114 (e.g. as best seen in FIG. 2), and a product branding 120 on the front 110 (as best seen in FIG. 1).

It is further understood that, while not depicted, the audio accessory 102 internally includes a speaker and/or a microphone mounted, for example, adjacent ports 122 at the front 110.

In a particular, example, the audio accessory 102 may comprise a remote speaker microphone (RSM) connectable to a radio and/or any other suitable communications device. However the audio accessory 102 may comprise any suitable audio accessory connectable to any suitable device that may produce sound signals for output as sound by a speaker of the audio accessory 102 and/or that may receive sound signals by way of a microphone of the audio accessory 102 detecting sound.

In particular examples, when the audio accessory 102 comprises an RSM, the audio accessory 102 may be used to conduct push-to-talk (PTT) communications over a network, via a radio, and the like, to which the RSM is connected, and, in these examples, the button 118 may comprise a PTT button. The audio accessory 102 may further comprise other buttons, such as a voice command, and the like, for example at the front 110 of the audio accessory 102 and/or the left side 114 and/or the right side 116. For example, an optional button 119 is depicted at a corner where the top 106 meets the right side 116.

The audio accessory 102 may comprise a body worn audio accessory that may be fastened to clothing and/or a uniform of a user, such as a first responder (e.g. a police officer). Alternatively, and/or in addition, audio accessory 102 may comprise a shoulder worn audio accessory that may be fastened to a clothing and/or a uniform of a user at their shoulder.

As such, it is further understood that the audio accessory 102 is intended to be operated when in an upright orientation and/or in about upright orientation, with the top 106 generally oriented upward and/or about upward, and the bottom 108 generally oriented downward and/or about downward. Hence, whether the audio accessory 102 is worn at a shoulder of a user, or at any other position at a body of a user, it is intended that the audio accessory 102 is be fastened in the upright (and/or about upright) orientation to a body (e.g. clothing) of a user, with the top 106 oriented about upward, the bottom 108 oriented about downward, the front 110 of the audio accessory 102 facing outwards relative to the user, the back 112 of the audio accessory 102 adjacent the body of the user, the left side 114 of the audio accessory 102 towards a left side of the body of the user, and the right side 116 oriented towards a right side of the body of the user (e.g. see FIG. 10A and FIG. 10A, described below).

As such, it is understood that, in the upright orientation fastened to a user, the button 118 of the audio accessory 102 is intended to be operated at the left side 114.

While an example product branding 120 comprises text "BRAND", the product branding 120 may comprise a company name (e.g. that produces the audio accessory 102), a product name, a logo, and/or any other suitable combination of alphanumeric product branding and/or graphic product branding. In particular, it is understood that the product branding 120 is readable, and/or intended to be viewed, when the audio accessory 102 is in an upright orientation, with the top 106 oriented upward and the bottom 108 oriented downward, and the product branding 120 facing outwards from a body of a user. Hence, as depicted, the text "BRAND" is understood to be generally readable, and/or intended to be viewed, when the audio accessory 102 is in an upright orientation, with the top 106 oriented upward and the bottom 108 oriented downward.

As best seen in FIG. 2, the audio accessory 102 further comprises an electrical interface 124 to communicatively couple the audio accessory 102 to a radio, and the like. For example, the electrical interface 124 is understood to be electrically coupled to a speaker and/or a microphone of the audio accessory 102, and/or any other electronics of the audio accessory 102 including, but not limited to, electronics that couple to the button 118, and/or any other buttons (e.g. such as the button 119), and the like, of the audio accessory 102.

As best seen in FIG. 2, in detail 125 showing a plane view of a portion of the back 112 of the audio accessory 102, the electrical interface 124 is generally located at the back 112 of the audio accessory 102 and, as depicted, may be located within a recess 126, the recess 126 located in a groove 128 at the back 112 of the audio accessory 102. The groove 128 generally extends along the back 112 of the audio accessory 102 from the top 106 to the bottom 108 and is to receive a back retention wall of the holder 104, explained in more detail below.

As will be explained herein, the holder 104 is generally to hold and/or retain the audio accessory 102 in two positions, and is generally removably attachable to the audio accessory 102.

As depicted, the holder 104 comprises a first retention platform 130 having a cable 132 coupled thereto. The cable 132 is understood to be connectable to a radio, and the like, and/or any other suitable device. As depicted, a connector 134 to the cable 132 extends from a cable-side of the first retention platform 130, the connector 134 comprising an extension of the first retention platform 130 towards the cable 132 that may be integrated with the first retention platform 130.

The holder 104 further comprises a second retention platform 136 and a back retention wall 138 extending between the first retention platform 130 and the second retention platform 136.

In general, the first retention platform 130, the second retention platform 136 and the back retention wall 138 generally form a clip for retaining the audio accessory 102.

For example, as depicted, the clip formed by the first retention platform 130, the second retention platform 136 and the back retention wall 138 comprises a C-shaped clip, with the retention platforms 130, 136 extending about perpendicularly from opposite ends of an audio-accessory-facing side of the back retention wall 138. However, the clip formed by the first retention platform 130, the second retention platform 136 and the back retention wall 138 may be of any suitable shape and/or type. Mounting of the clip, formed by the first retention platform 130, the second retention platform 136 and the back retention wall 138, is described in more detail below.

The holder 104 further comprises an electrical interface 140, located at the back retention wall 138, in particular at the audio-accessory facing side of the back retention wall 138 (e.g. a same side of the back retention wall 138 from which the retention platforms 130, 136 extend). As depicted, the electrical interface 140 extends from a protrusion 142 from the back retention wall 138. In general, the electrical interface 140 is configured to mate with the corresponding electrical interface 124 of the audio accessory 102. Furthermore, the protrusion 142 is to mate with, and/or insert into, the recess 126 of the audio accessory 102. Hence, the recess 126 and the protrusion 142 are understood to have respective shapes that are complimentary to each other.

The electrical interface 140 is understood to be in electrical communication with electrical connections of the cable 132, such that the electrical interface 140 is generally for coupling the cable 132 to the corresponding electrical interface 124 of the audio accessory 102. Put another way, when the holder 104 is retaining the audio accessory 102, the electrical interfaces 124, 140 mate to electrically couple the audio accessory 102 to the cable 132 and hence to a radio, and the like.

In general, the clip formed by the first retention platform 130, the second retention platform 136 and the back retention wall 138 is interchangeably mountable in a first position and a second position relative to the audio accessory 102. FIG. 1 and FIG. 2 shows the clip and/or the holder 104 being mounted to the audio accessory 102 in the first position, such that, in the first position, the clip and/or the holder 104 mounts to the audio accessory 102 with the cable 132 extending from the bottom 108 of the audio accessory 102. As will be explained in further detail below with reference to FIG. 6, FIG. 7, FIG. 8 and FIG. 9, in the second position, the clip and/or the holder 104 mounts to the audio accessory 102 with the cable 132 extending from the top 106 of the audio accessory 102.

In particular, the back retention wall 138 is understood to be of a shape and size that is complementary to the groove 128 of the audio accessory 102, such that the back retention wall 138 fits into the groove 128. Furthermore, both the groove 128 and the back retention wall 138 are symmetrical about a lateral center axis 144 (e.g. of the holder 104 and/or the back retention wall 138 and/or the audio accessory 102 and/or the groove 128), such that the back retention wall 138 may be received within the groove 128 in the first position, as depicted in FIG. 1 and FIG. 2, or when rotated by about 180° relative to the audio accessory 102. In particular, the first position and the second position are understood to be about 180° relative to one another.

Put another way, the audio accessory 102 comprises the groove 128 shaped to receive the back retention wall 138 of the holder 104 in both the first position and the second position. Put yet another way, the groove 128 is symmetrical (e.g. about the lateral center axis 144). Put yet another way, the audio accessory 102 comprises the symmetrical groove 128 shaped to receive the back retention wall 138 of the holder 104 in both the first position and the second position.

Furthermore, as depicted, the back retention wall 138 is an hourglass shape, with widths at respective ends (e.g. from which the retention platforms 130, 136 extend) being wider than the connector 134 to the cable 132 at the first retention platform 130. In particular, the widening of the back retention wall 138 to form the hourglass shape may accommodate the size and/or diameter of the connector 134 and/or the cable 132, which may have particular physical constraints that define their respective sizes or diameters. For example, the cable 132 may, as depicted, include features 146 that restrict movement of the cable 132 where joined to the connector 134, and that widen the cable 132 where joined to the connector 134; such features 146 may reduce stress at the cable 132 in this region.

As depicted, the groove 128 is also an hourglass shape that is complementary to the hourglass shape of the back retention wall 138.

However, the back retention wall 138 and the groove 128 may be of any suitable shape that enables the back retention wall 138 to be received into the groove 128 in both the first position and the second position. For example, the back retention wall 138 may be a bar shape (e.g. with about equal width, and/or rectangular cross-section, between the retention platforms 130, 136), with a width thereof wider than the connector 134 to the cable 132 at the first retention platform 130. In these examples, the groove 128 may be a complementary bar shape.

As depicted, the audio accessory 102 further comprises a bottom groove 148 and a top groove 150 to receive, and/or mate with, the first retention platform 130 and the second retention platform 136 of the holder 104 in both the first position and the second position. For example, as depicted, both the retention platforms 130, 136 are bar-shaped (e.g. have an about constant about rectangular cross-section, but with outer sides being slightly curved), and the grooves 148, 150 are also bar-shaped. As the grooves 148, 150 are to receive, and/or mate with, either of the retention platforms 130, 136, at least the respective sides (e.g. platform-facing sides) of the grooves 148, 150 that contact the retention platforms 130, 136 have a same and/or similar shape and/or configuration. Similarly. at least the respective sides (e.g. groove-facing sides) of the retention platforms 130, 136 that contact the grooves 148, 150 have a same and/or similar shape and/or configuration.

Furthermore, to retain the holder 104 at the audio accessory 102, the grooves 148, 150 include respective recesses 152, 154 that receive respective complementary protrusions 156, 158 located at groove-facing sides of the retention platforms 130, 136. One protrusion 158 is depicted in FIG. 1 in detail 159 showing a perspective view of a groove-facing side of the second retention platform 136, and which shows the protrusion 158 having a generally rounded rectangular profile. However, any suitable shape is within the scope of the present specification. It is understood that both protrusions 156, 158 have a same and/or similar shape, and the recesses 152, 154 have a same and/or similar shape complementary to the protrusions 156, 158. Furthermore, locations of the recesses 152, 154 and the protrusions 156, 158 may be reversed, such that the protrusions 156, 158 are located in respective grooves 148, 150, and the recesses 152, 154 are located at respective retention platforms 130, 136.

Regardless, it understood that the clip formed by the first retention platform 130, the second retention platform 136 and the back retention wall 138 may "snap" into respective grooves 150, 148, 128, and be removably held in place by the protrusions 156, 158 being retained by respective recesses 152, 154. Furthermore, at least the first retention platform 130, the second retention platform 136 and the back retention wall 138 may be formed from any suitable at least partially bendable and/or deformable material, such as a suitable plastic, and the like, to which force may be applied to temporarily bend and/or deform the holder 104 to release the audio accessory 102 from the holder 104.

However, it is understood that the protrusions 156, 158 and respective recesses 152, 154 are only one example of a retention mechanism for retaining the audio accessory 102 at the holder 104. In other examples, removable screws and/or fasteners, and the like, may be used to retain the audio accessory 102 at the holder 104 (e.g. in place of the protrusions 156, 158 and respective recesses 152, 154, the retention platforms 130, 136 and the top 106 and bottom 108 of the audio accessory 102 may include respective apertures into which such screws and/or fasteners may be inserted). Alternatively, at least a portion of the retention platforms 130, 136 may be removably retained in respective apertures at the back side 112 of the audio accessory 102.

It is further understood that the electrical interface 140 of the holder 104 and the corresponding electrical interface 124 of the audio accessory 102 may be respectively symmetrical about the lateral center axis 144 (e.g. of the back retention wall 138), such that the electrical interface 140 of the holder 104 and the corresponding electrical interface 124 of the audio accessory 102 connect to each other in both the first position and the second position. For example, as depicted, the electrical interface 140 of the holder 104 may comprise a USB-C (Universal Serial Port-C) connector, and the corresponding electrical interface 124 of the audio accessory 102 may comprise a corresponding USB-C port, that may be connectable in two positions that are 180° to each other. It is further understood, however, that types of the electrical interfaces 124, 140 may be reversed, such that the electrical interface 140 of the holder 104 may comprise a USB-C port, and the like and the corresponding electrical interface 124 of the audio accessory 102 may comprise a corresponding USB-C connector, that may be connectable in two positions that are 180° to each other Alternatively, and/or in addition, one or more of the electrical interface 140 of the holder 104 and the corresponding electrical interface 124 of the audio accessory 102 may rotate, such that the electrical interface 140 of the holder 104 and the corresponding electrical interface 124 of the audio accessory 102 connect to each other in both the first position and the second position via one or more of the electrical interface 140 of the holder 104 and the corresponding electrical interface 124 of the audio accessory 102 rotating. For example, while the electrical interface 124, 140 may be located at the lateral center axis 144, they may not be symmetrical about the lateral center axis 144. In a particular example, the electrical interface 140 of the holder 104 may comprise a micro USB-B connector, and the corresponding electrical interface 124 of the audio accessory 102 may comprise a micro USB-B port, which rely on a particular orientation to connect to one another. As such, in some of these examples, the protrusion 142 may rotate such that the electrical interface 140 of the holder 104 rotates, and, when the holder 104 is rotated by 180°, the protrusion 142 may also rotate by 180° to ensure the electrical interface 140 of the holder 104 and the corresponding electrical interface 124 of the audio accessory 102 are in an orientation, relative to each other, where they connect. However, either of the electrical interfaces 124,140 may be rotatable.

However, any suitable configuration of the electrical interfaces 124,140 is within the scope of the present specification; for example the of the electrical interfaces 124,140 may not be located respectively located in the recess 126 and extending from the protrusion 142, but may any suitable other geometries that enable the electrical interfaces 124,140 to mate in the first position and the second position.

The audio accessory system 100 may include other features. For example, as best seen in FIG. 1, the holder 104 may further comprises a button 160 at the second retention platform 136, for example at a side of the second retention platform 136 opposite a groove-facing side. The button 160 may be optional, however, when present, the button 160 may be electrically connected to the electrical interface 140 of the holder 104, and the button 160 may be to control a function of the audio accessory 102. For example, the button 160 may, when the holder retains the audio accessory 102, be connected to electronics in the audio accessory 102, via the electrical interfaces 124, 140, such that, when the button 160 is actuated, a function, such as a voice-command function among other possibilities, is initiated and/or controlled at the audio accessory 102.

Figure 3:
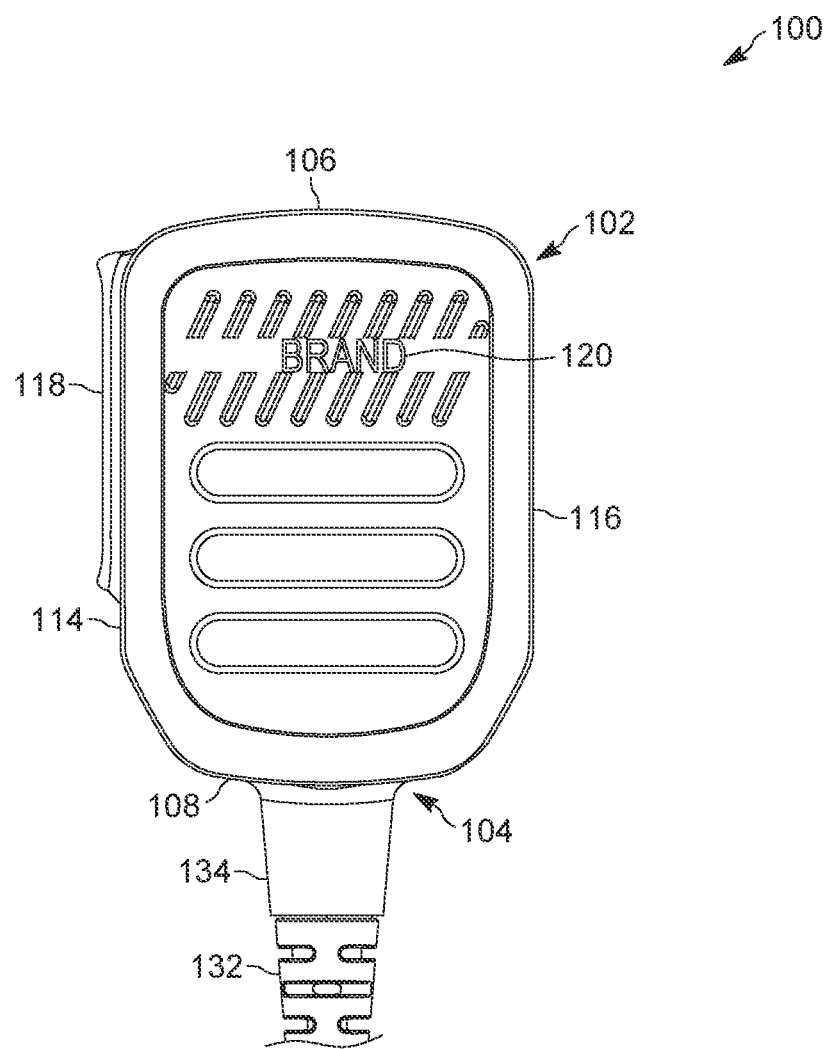
FIG. 3 depicts a front view of the audio accessory system of FIG. 1, as assembled with the holder mounted to the audio accessory in the first position, in accordance with some examples.
Figure 4:
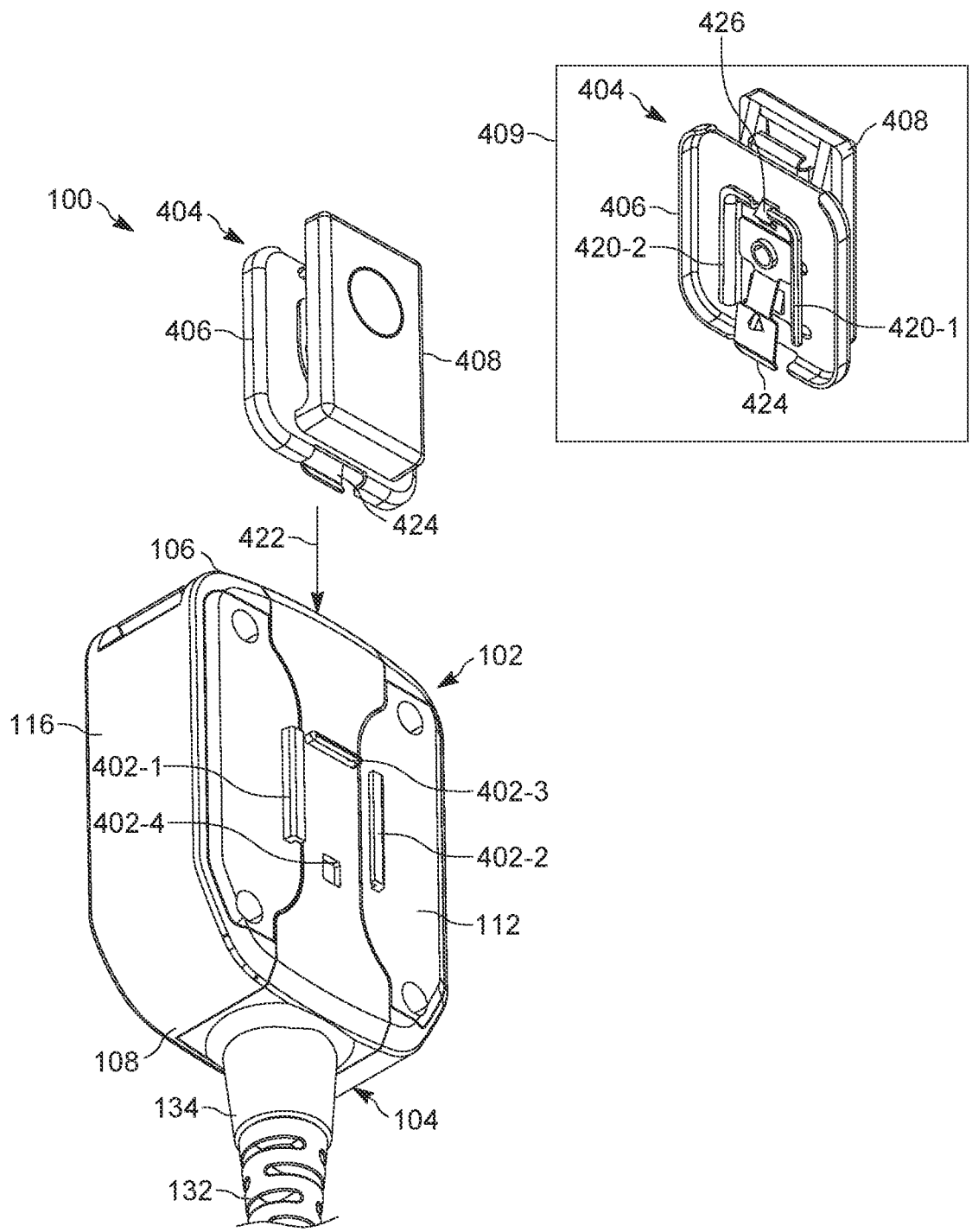
FIG. 4 is a back perspective view of the audio accessory system of FIG. 1, as assembled with the holder mounted to the audio accessory in the first position, and further showing a fastener that attaches to the combination of the holder and the audio accessory, in accordance with some examples.

Attention is next directed to FIG. 3 and FIG. 4, which depict front and rear views of the system 100 as assembled in the first position, for example with the holder 104, and/or the clip formed by the first retention platform 130, the second retention platform 136 and the back retention wall 138, retaining the audio accessory 102 in the first position.

It is understood from at least FIG. 3 that, in the first position, the cable 132 extends from the bottom 108 of the audio accessory 102.

From at least FIG. 4 it is understood that the holder 104 is further generally shaped such that, when the holder 104 retains the audio accessory 102, sides of the holder 104 opposite the grooves 128, 148, 150, are flush with respective sides of the audio accessory 102. In particular, as the holder 104 retains the audio accessory 102 in both the first position, and a second position where the cable 132 extends from the top 106 of the audio accessory 102 and/or about 180° to the first position, the shape of the top 106 and bottom 108 of the audio accessory 102 may be the same and/or similar, at least adjacent the grooves 148, 150. A such, when the holder 104 retains the audio accessory 102, sides of the holder 104 opposite the grooves 148, 150, are flush with respective sides of the audio accessory 102 in both the first position and the second position. Similarly, the back 112 of the audio accessory 102 and a side of the holder 104 opposite the groove 128 may be shaped such that, the side of the holder 104 opposite the groove 128 is flush with the back side 112 of the audio accessory 102 in both the first position and the second position.

Attention is next directed to FIG. 4. From FIG. 4 is understood that the system 100 may further comprise an arrangement of fastener connectors 402-1, 402-2, 402-3, 402-4 located at one or more of the audio accessory 102 and the holder 104. The fastener connectors 402-1, 402-2, 402-3, 402-4 are interchangeably referred to hereafter, collectively, as the fastener connectors 402 and, generically, as a fastener connector 402.

In these examples, the system 100 further comprises a fastener 404 attachable to the arrangement of the fastener connectors 402 when the audio accessory 102 and the holder 104 are assembled. The fastener 404 is generally being rotatable relative to the audio accessory 102 and the holder 104. For example, as depicted, the fastener 404 comprises: a base 406 that attaches to the arrangement of the fastener connectors 402 when the audio accessory 102 and the holder 104 are assembled; and a clip 408 that is rotatably attached to the base 406. Hence, once the fastener 404 is attached to the assembled audio accessory 102 and holder 104, the clip may be rotated to a desired position, relative to the assembled audio accessory 102 and holder 104, and attached to clothing of a user. An inset 409 in FIG. 4 depicts an accessory-facing side of the fastener 404.

For example, as depicted, the fastener connectors 402-1, 402-2 comprise parallel rails (e.g. and/or about parallel rails), and the like, which partially extend along the back 112 of the audio accessory 102, in a direction between the top 106 and bottom 108 of the audio accessory 102, and symmetrically arranged relative to the groove 128. The fastener connector 402-3 comprises a rail located at the holder 104, that is about perpendicular to the parallel rails of the fastener connectors 402-1, 402-2, and located an end of the parallel rails of the fastener connectors 402-1, 402-2 closest to the top 106 of the audio accessory 102 (e.g. when the system 100 is assembled). The fastener connector 402-4 comprises a recess, located at the holder 104, that is located an end of the parallel rails of the fastener connectors 402-1, 402-2 closest to the bottom 108 of the audio accessory 102 (e.g. when the system 100 is assembled).

In general, as best seen at the inset 409, corresponding connectors 420-1, 420-2 of the fastener 404, located at an accessory-facing side of the base 406, may slide onto corresponding the parallel rails of the fastener connectors 402-1, 402-2, for example in a direction 422 (e.g. represented by an arrow) towards the rail of the fastener connector 402-3. A biased arm 424 of the fastener 404, also located at an accessory-facing side of the base 406, may releasably "snap" into the recess of the fastener connector 402-4, which assists at holding the fastener 204 in an attached position relative to the audio accessory 102 and the holder 104. Further assistance with holding the fastener 404 in in the attached position may be provided by a corresponding stop bar 426 of the fastener 404, located at the accessory-facing side of the base 406, being stopped by the rail of the fastener connector 402-3. It is understood that the fastener 404 may be removed by releasing the biased arm 424 from the recess of the fastener connector 402-4, and sliding the fastener 404 in a direction opposite that of the direction 422.

Figure 5:
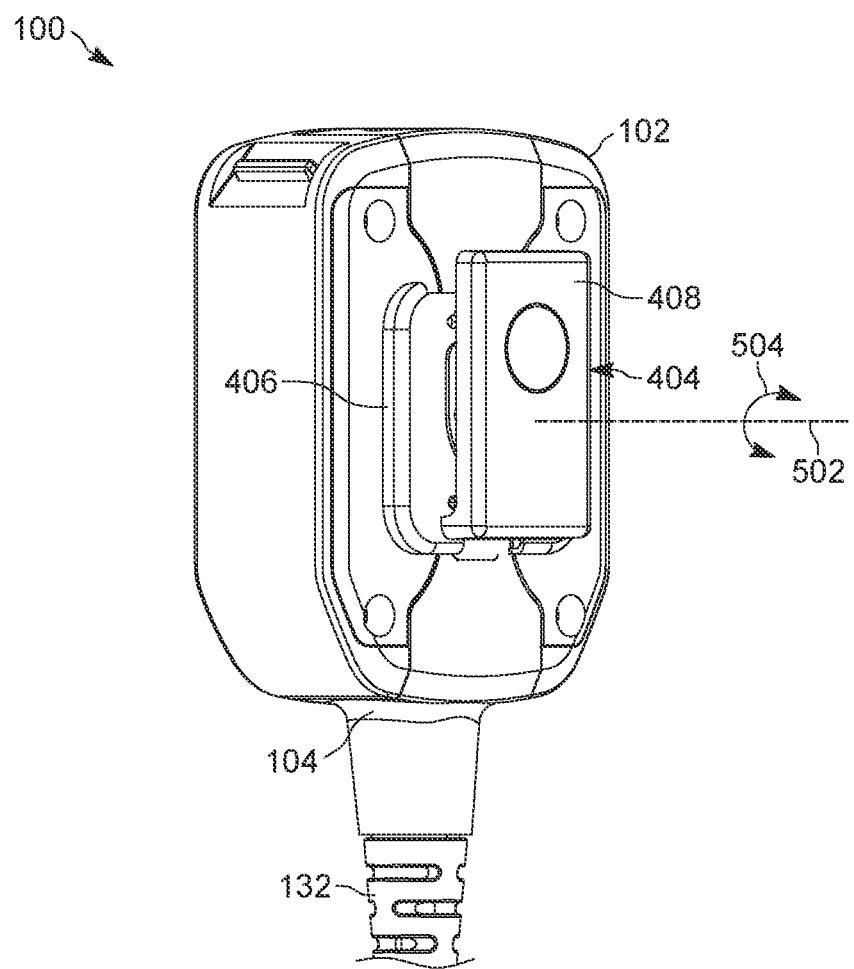
FIG. 5 is a back perspective view of the audio accessory system of FIG. 1, as assembled with the holder mounted to the audio accessory in the first position, and fastener attached to the combination of the holder and the audio accessory, in accordance with some examples.

FIG. 5 depicts the system 100 as fully assembled, with the holder 104 retaining the audio accessory 102, and the fastener 404 attached to the combination of the audio accessory 102 and the holder 104. It is understood from FIG. 5 that the fastener 404 may be attached to the combination of the audio accessory 102 and the holder 104 such that the clip 408 may rotate (e.g. 360° or any suitable amount) clockwise, and/or counterclockwise, about a center axis 502 of the audio accessory 102, as represented by the arrow 504. The center axis 502 is understood to be normal from the back 112 of the audio accessory 102, and may be located at a center of the groove 128 at the back 112. The center axis 502 and the lateral center axis 144 are understood to be about perpendicular with each other, and may intersect.

Figure 6:
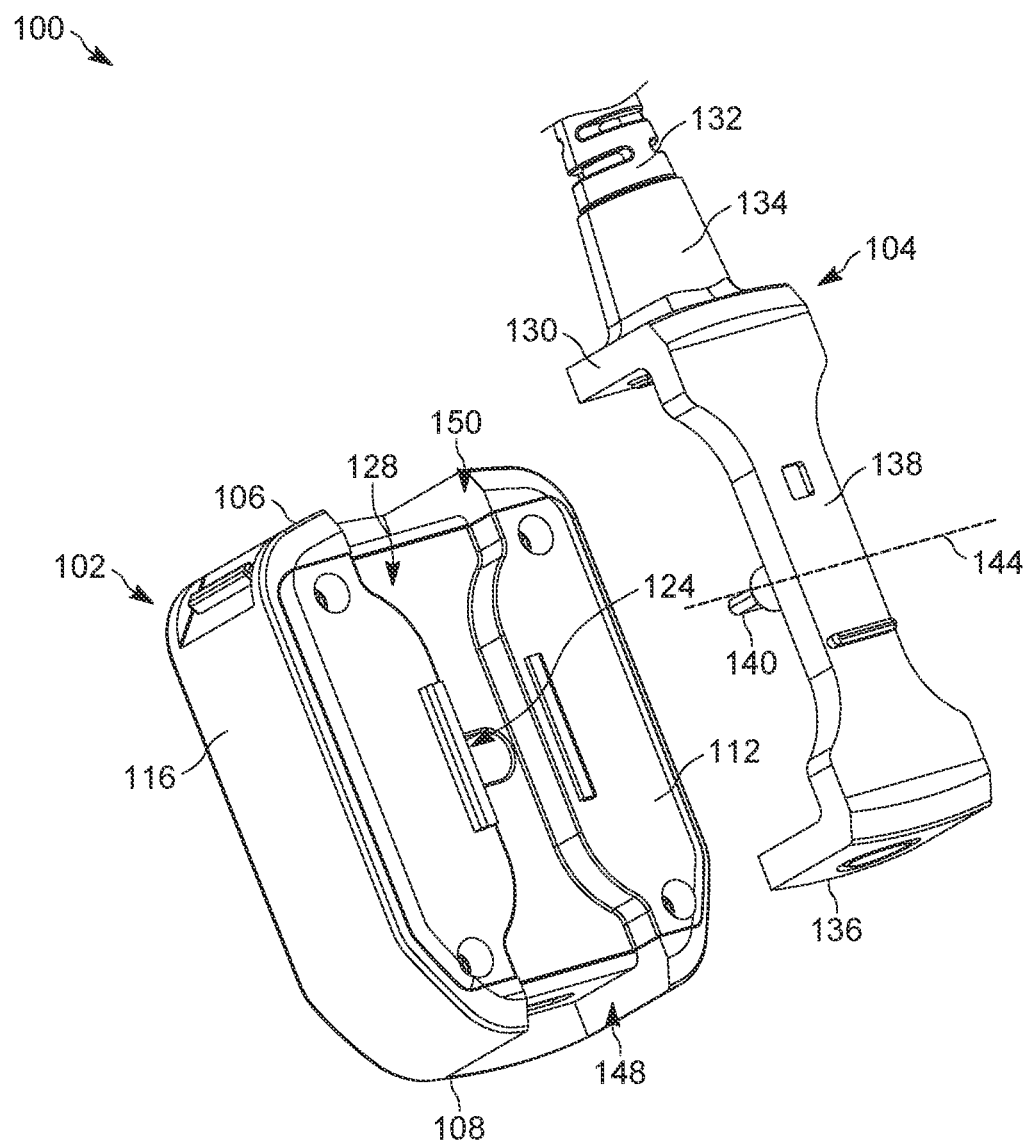
FIG. 6 is a perspective view of the audio accessory system of FIG. 1, but with the holder being mounted to the audio accessory in a second position, in accordance with some examples.

Attention is next directed to FIG. 6 which depicts the system 100 with the holder 104 disassembled from the audio accessory 102, and with the holder 104 rotated by 180° relative to FIG. 1 and FIG. 2. In particular, the holder 104 is being attached to the audio accessory 102 according to the second position. As such, it is understood that the first retention platform 130 may mate with the groove 150 at the top 106 of the audio accessory 102, and the second retention platform 136 may mate with a respective groove 148 at the bottom 108 of the audio accessory 102. Furthermore, as the back retention wall 138 and the groove 128 at the back 112 of the audio accessory 102 are symmetrical about the lateral center axis 144, the groove 128 may receive, and/or mate with, the back retention wall 138 in the second position.

Similarly, as the electrical interfaces 124, 140 are also respectively symmetrical relative to the lateral center axis 144, the electrical interfaces 124, 140 further connect in the second position. To achieve such symmetry, the electrical interfaces 124, 140 may be centered along the center axis 502 (not depicted in FIG. 5, but nonetheless understood to be present) when the holder 104 and the audio accessory 102 are assembled in either the first position or the second position.

Figure 7:
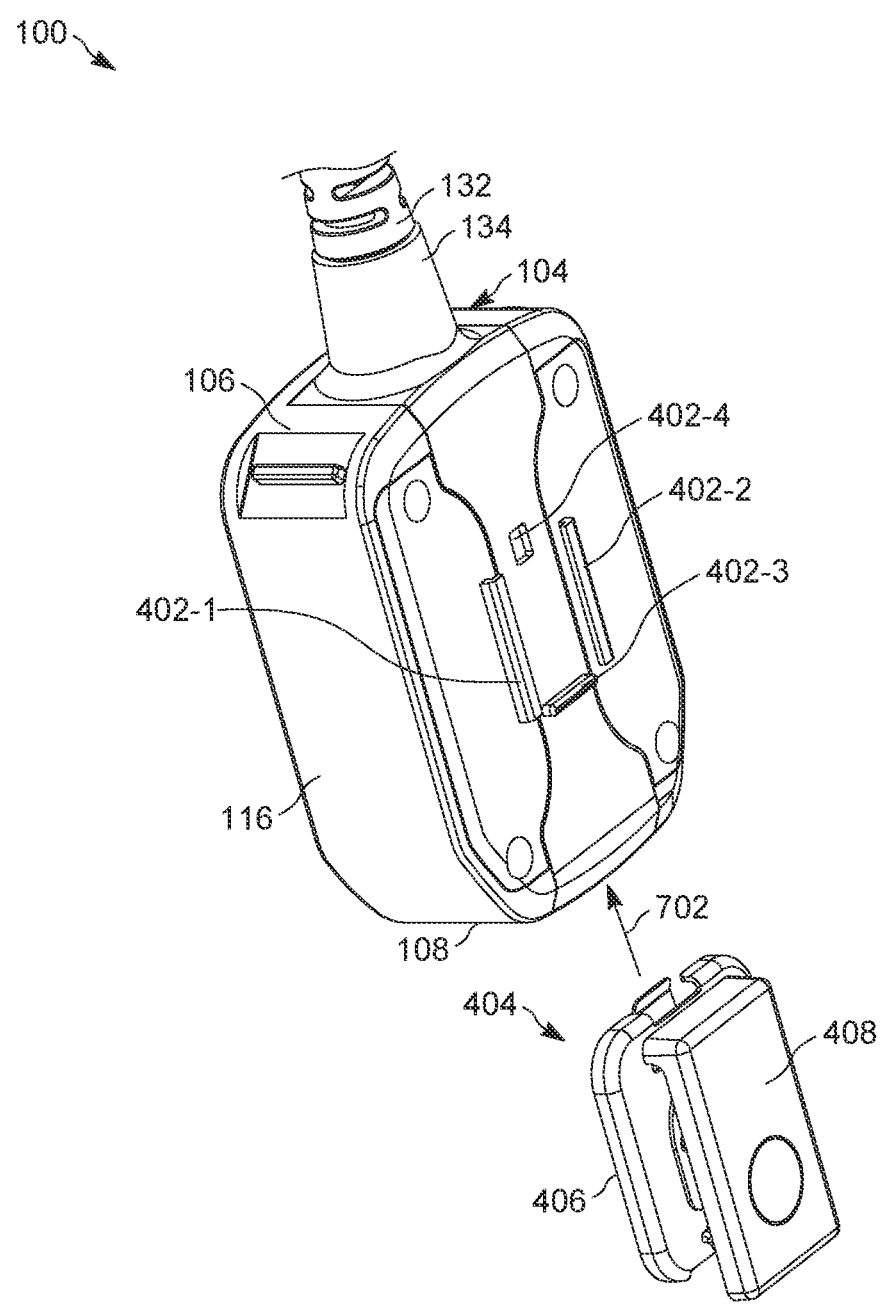
FIG. 7 is a back perspective view of the audio accessory system of FIG. 6, as assembled with the holder mounted to the audio accessory in the second position, and further showing the fastener that attaches to the combination of the holder and the audio accessory, in accordance with some examples.

Attention is next directed to FIG. 7 which depicts a back perspective view of the audio accessory 102 and the holder 104, as assembled. It is understood that the locations of the rail of the fastener connector 402-3 and the recess of the fastener connector 402-4 are reversed, relative to FIG. 4, such that the rail of the fastener connector 402-3 is closer to the bottom 108 of the audio accessory 102, and the recess of the fastener connector 402-4 is closer to the top 106 of the audio accessory 102. As such, the base 406 of the fastener 404 is understood to slide onto the combination of the audio accessory 102 and the holder 104 from a direction 702 (as represented by an arrow) opposite to that of FIG. 4, relative to the top 106 and bottom 108 of the audio accessory 102.

The clip 408 may be rotated to a similar position as depicted in FIG. 5 relative to the top 106 and bottom 108 of the audio accessory 102.

Figure 8:
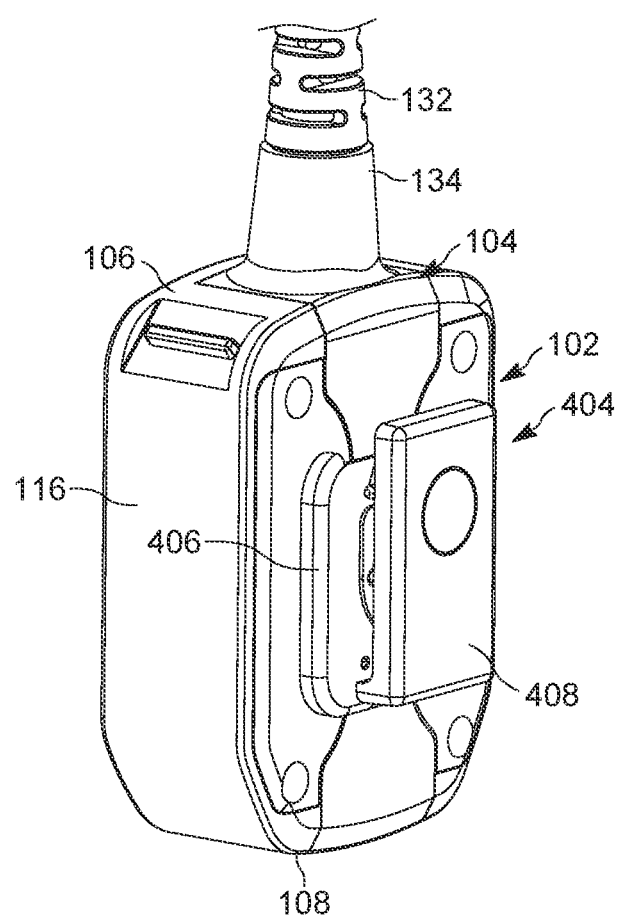
FIG. 8 is a back perspective view of the audio accessory system of FIG. 6, as assembled with the holder mounted to the audio accessory in the second position, and fastener attached to the combination of the holder and the audio accessory, in accordance with some examples.
Figure 9:
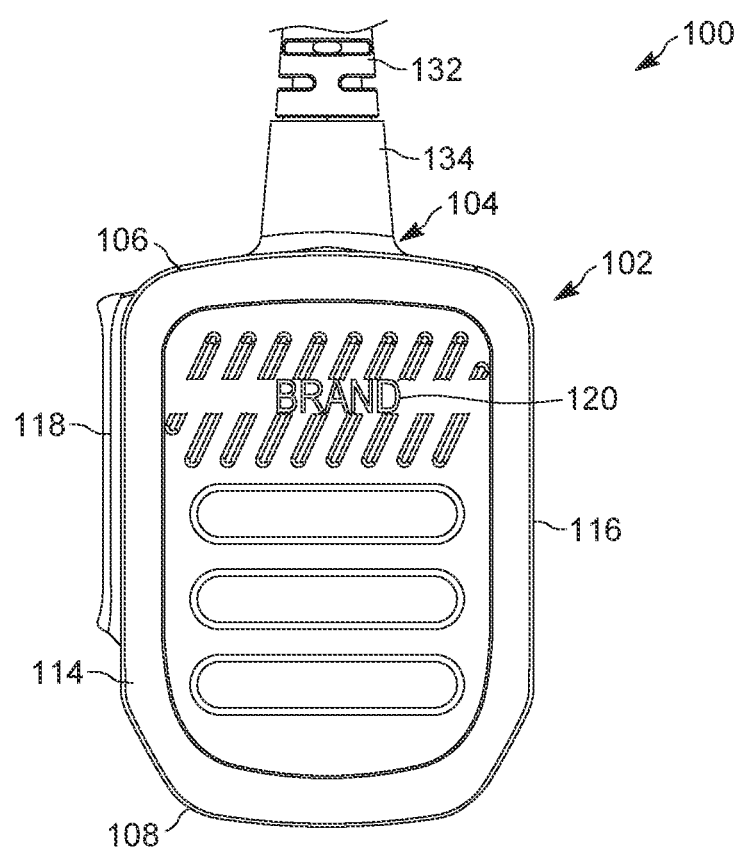
FIG. 9 depicts a front view of the audio accessory system of FIG. 6, with the holder mounted to the audio accessory in the second position, in accordance with some examples.

Attention is next directed to FIG. 8 and FIG. 9 which respectively depict a back perspective view and a front view of the system 100 as assembled. FIG. 8 depicts the clip 408 rotated to a similar position as depicted in FIG. 5 relative to the top 106 and bottom 108 of the audio accessory 102. From both FIG. 8 and FIG. 9 it is understood that, in the second position, the cable 132 extends from the top 106 of the audio accessory 102.

Hence, by comparing at least FIG. 3 with FIG. 9, it is understood that: in the first position, the clip, formed by the first retention platform 130, the second retention platform 136 and the back retention wall 138, mounts to the audio accessory 102 with the cable 132 extending from the bottom 108 of the audio accessory 102 (e.g. as depicted in FIG. 3); and, in the second position, the clip formed by the first retention platform 130, the second retention platform 136 and the back retention wall 138, mounts to the audio accessory 102 with the cable 132 extending from the top 106 of the audio accessory 102.

Figure 10A:
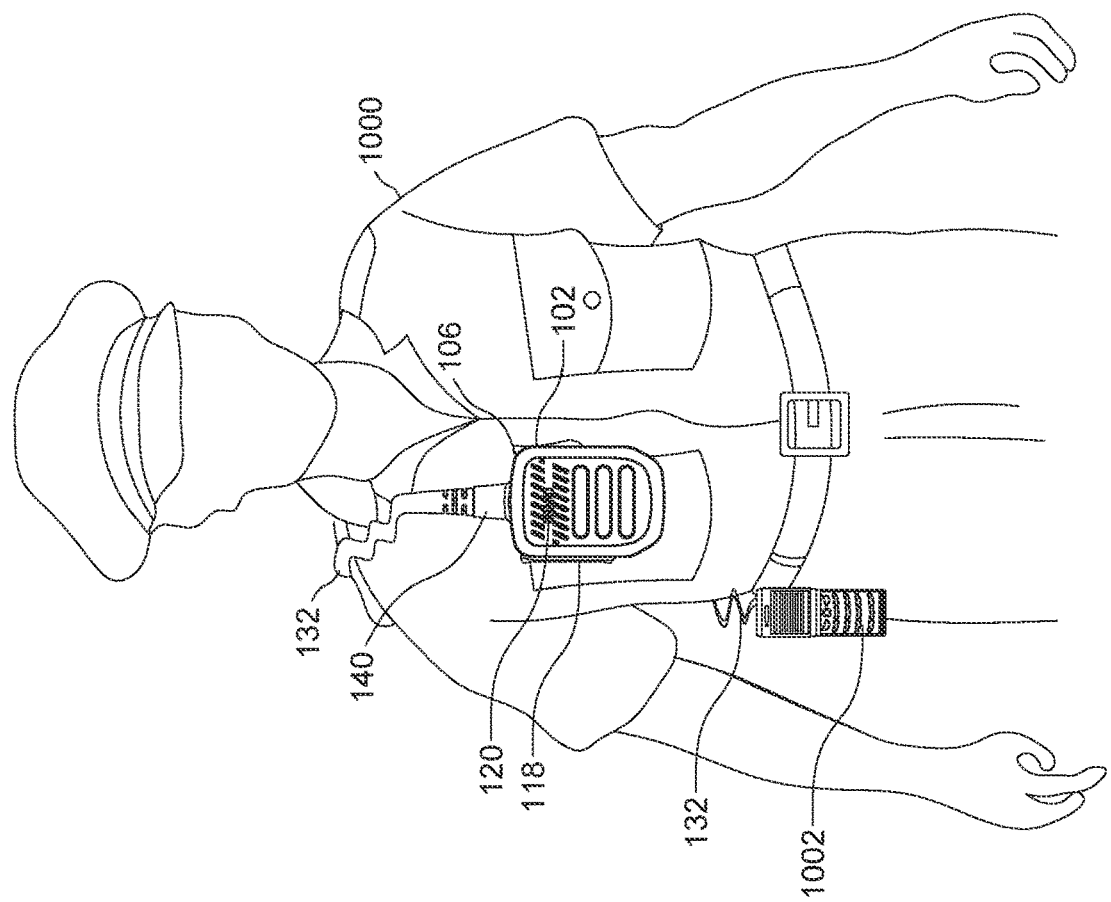
FIG. 10A depicts the audio accessory system of FIG. 1 being worn by a first responder with the holder mounted to the audio accessory in the first position.
Figure 10B:
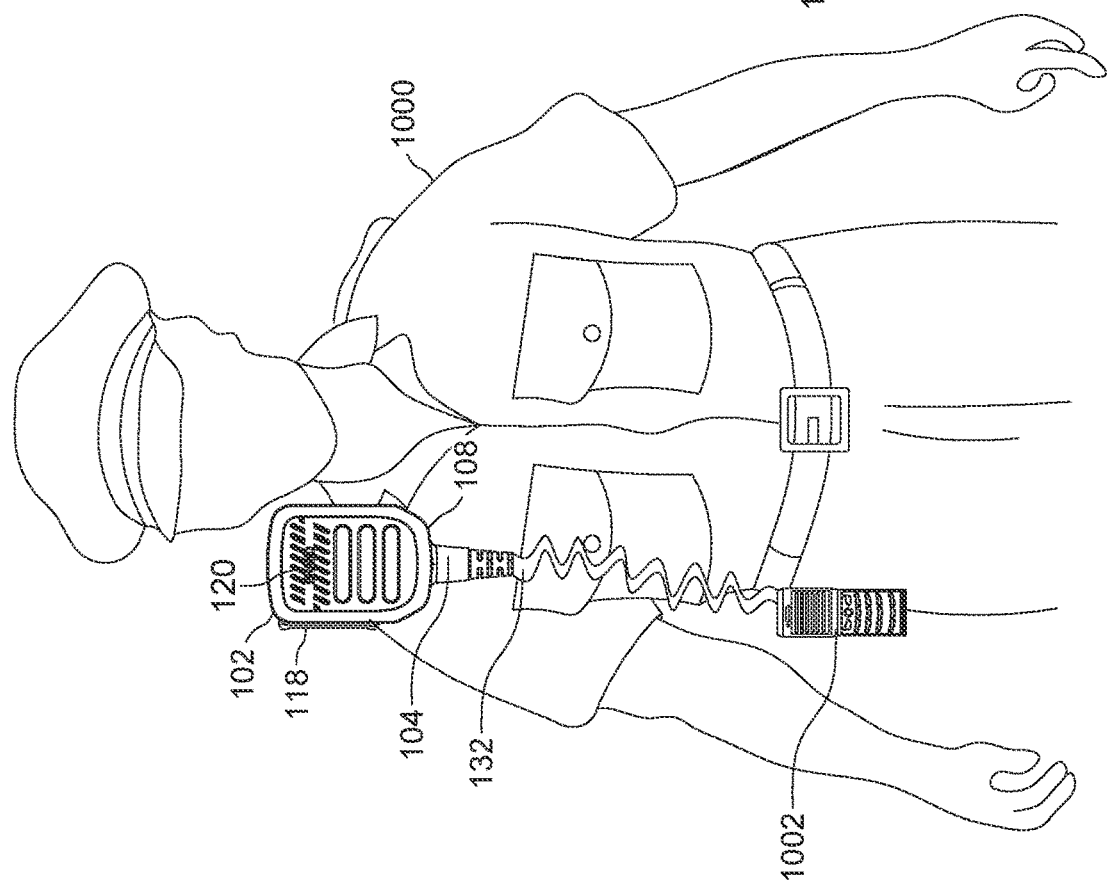
FIG. 10B depicts the audio accessory system of FIG. 1 being worn by a first responder with the holder mounted to the audio accessory in the second position.

Attention is next directed to FIG. 10A and FIG. 10B which depicts a user 1000 using the system 100 according to, respectively, the first position and the second position. In both FIG. 10A and FIG. 10B, the user 1000 has attached the audio accessory 102 to their shoulder, for example using the clip 408.

In particular, in FIG. 10A, the audio accessory 102 has been assembled with the holder 104 in the first position, such that the cable 132 extends from the bottom 108 of the audio accessory 102 and down a front of the user 1000, for example to a 1002 worn, for example, on a belt of the user 1000. Conversely, in FIG. 10B, the audio accessory 102 has been assembled with the holder 104 in the second position, such that the cable 132 extends from the top 106 of the audio accessory 102, over a shoulder of the user 1000, down their back and to the radio 1002.

In each of FIG. 10A and FIG. 10B, the audio accessory 102 is in an upright position or an about upright position. As such, the button 118, to control operation of the audio accessory 102, is accessible from a same and/or similar orientation in both the first position and the second position. For example, the user 1000 may use their right hand to operate the button 118 without covering the front 110 of the audio accessory 102 in either of the first position and the second position.

Furthermore, the product branding 120 disposed on the audio accessory 102 remains generally readable, and/or in an upright position, in both the first and second positions.

Hence, the audio accessory system 100 generally provides versatility in attaching the audio accessory 102 to a user's clothing, and the like, allowing the cable 132 to be routed down a front of the user or over a shoulder of the user, with the audio accessory 102 being in an upright position in both situations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

Similarly, in this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An audio accessory system comprising:
an audio accessory; and
a holder for the audio accessory comprising:
   a first retention platform having a cable coupled thereto;
   a second retention platform;
   a back retention wall extending between the first retention platform and the second retention platform,
   the first retention platform, the second retention platform and the back retention wall generally forming a clip for retaining the audio accessory; and
   an electrical interface, located at the back retention wall, the electrical interface for coupling the cable to a corresponding electrical interface of the audio accessory, and
   the clip being interchangeably mountable in a first position and a second position relative to the audio accessory, such that:
   in the first position, the clip mounts to the audio accessory with the cable extending from a bottom of the audio accessory, and
   in the second position, the clip mounts to the audio accessory with the cable extending from a top of the audio accessory.

2. The audio accessory system of claim 1, wherein the clip formed by the first retention platform, the second retention platform and the back retention wall comprises a C-shaped clip.

3. The audio accessory system of claim 1, wherein the back retention wall is an hourglass shape, with widths at respective ends being wider than a connector to the cable at the first retention platform.

4. The audio accessory system of claim 1, wherein the back retention wall is a bar shape, with a width thereof wider than a connector to the cable at the first retention platform.

5. The audio accessory system of claim 1, wherein the back retention wall is symmetrical about a lateral center axis of the back retention wall.

6. The audio accessory system of claim 1, wherein the audio accessory comprises a groove shaped to receive the back retention wall of the holder in both the first position and the second position.

7. The audio accessory system of claim 1, wherein the audio accessory comprises a symmetrical groove shaped to receive the back retention wall of the holder in both the first position and the second position.

8. The audio accessory system of claim 1, wherein the audio accessory comprises a bottom groove and a top groove to receive the first retention platform and the second retention platform of the holder in both the first position and the second position.

9. The audio accessory system of claim 1, wherein the electrical interface of the holder and the corresponding electrical interface of the audio accessory are respectively symmetrical about a lateral center axis of the back retention wall, such that the electrical interface of the holder and the corresponding electrical interface of the audio accessory connect to each other in both the first position and the second position.

10. The audio accessory system of claim 1, wherein one or more of the electrical interface of the holder and the corresponding electrical interface of the audio accessory rotate, such that the electrical interface of the holder and the corresponding electrical interface of the audio accessory connect to each other in both the first position and the second position via one or more of the electrical interface of the holder and the corresponding electrical interface of the audio accessory rotating.

11. The audio accessory system of claim 1, further comprising:
an arrangement of fastener connectors located at one or more of the audio accessory and the holder; and
a fastener attachable to the arrangement of the fastener connectors when the audio accessory and the holder are assembled, the fastener being rotatable relative to the audio accessory and the holder.

12. The audio accessory system of claim 1, wherein the holder further comprises a button at the second retention platform, the button electrically connected to the electrical interface of the holder, the button to control a function of the audio accessory.

13. The audio accessory system of claim 1, wherein the audio accessory further comprises a button to control operation of the audio accessory, the button being accessible from a same orientation in both the first position and the second position.

14. The audio accessory system of claim 1, wherein a product branding disposed on the audio accessory remains readable in both the first and second positions.

15. The audio accessory system of claim 1, wherein the audio accessory comprises a body worn audio accessory.

16. The audio accessory system of claim 1, wherein the audio accessory comprises a shoulder worn audio accessory.

17. The audio accessory system of claim 1, wherein the audio accessory comprises a remote speaker microphone.

18. A holder for an audio accessory, the holder comprising:
   a first retention platform having a cable coupled thereto;
   a second retention platform;
   a back retention wall extending between the first retention platform and the second retention platform,
   the first retention platform, the second retention platform and the back retention wall generally forming a clip for retaining the audio accessory; and
   an electrical interface, located at the back retention wall, the electrical interface for coupling the cable to a corresponding electrical interface of the audio accessory, and
   the clip being interchangeably mountable in a first position and a second position relative to the audio accessory, such that:
   in the first position, the clip mounts to the audio accessory with the cable extending from a bottom of the audio accessory, and
   in the second position, the clip mounts to the audio accessory with the cable extending from a top of the audio accessory.

* * * * *